(12) United States Patent
Maniktala (10) Patent No.: US 10,110,063 B2
(45) Date of Patent: Oct. 23, 2018

(54) WIRELESS POWER ALIGNMENT GUIDE

(71) Applicant: Sanjaya Maniktala, Fremont, CA (US)

(72) Inventor: Sanjaya Maniktala, Fremont, CA (US)

(73) Assignee: ChargEdge, Inc., Fremont, CA (US)

( * ) Notice: Subject to any disclaimer, the term of this patent is extended or adjusted under 35 U.S.C. 154(b) by 149 days.

(21) Appl. No.: 15/082,641

(22) Filed: Mar. 28, 2016

(65) Prior Publication Data

US 2016/0285312 A1    Sep. 29, 2016

Related U.S. Application Data

(60) Provisional application No. 62/139,785, filed on Mar. 29, 2015, provisional application No. 62/142,465, filed on Apr. 2, 2015.

(51) Int. Cl.

| | |
|---|---|
| *H02J 50/10* | (2016.01) |
| *H02J 50/40* | (2016.01) |
| *H01F 38/14* | (2006.01) |
| *H01F 27/28* | (2006.01) |
| *H01F 27/40* | (2006.01) |

(52) U.S. Cl.
CPC .............. *H02J 50/10* (2016.02); *H01F 38/14* (2013.01); *H02J 50/40* (2016.02); *H01F 27/2804* (2013.01); *H01F 27/402* (2013.01)

(58) Field of Classification Search
CPC ...................................................... H02J 50/10
See application file for complete search history.

(56) References Cited

U.S. PATENT DOCUMENTS

| | | |
|---|---|---|
| 6,212,430 B1 | 4/2001 | Kung |
| 7,948,781 B2 | 5/2011 | Esaka et al. |
| 9,276,437 B2 | 3/2016 | Partovi et al. |

(Continued)

FOREIGN PATENT DOCUMENTS

| | | |
|---|---|---|
| WO | WO3013122483 A1 | 8/2013 |
| WO | WO2013154440 A1 | 10/2013 |

OTHER PUBLICATIONS

"Notification of Transmittal of the International Search Report and the Written Opinion of the International Searching Authority," Int'l Appl. No. PCT/US2016/024483, dated Jun. 20, 2016.

(Continued)

*Primary Examiner* — Hai L Nguyen
(74) *Attorney, Agent, or Firm* — White & Case LLP (57) ABSTRACT

In one embodiment, a wireless power alignment guide uses multiple coils and a detector circuit to determine an offset between a wireless power receiver and a wireless power transmitter. A transmitter generates a magnetic field that causes a first time-varying current to flow in a first coil and a second time-varying current to flow in a second coil of the wireless power alignment guide. The first time-varying current can flow to the second coil and the second time-varying current can flow to the first coil. A detector circuit detects a voltage resulting from the first time-varying current and the second time-varying current and determines an offset so the user can center the receiver with the transmitter. By correcting any offset between the receiver and the transmitter, greater amounts of power can be transferred to the receiver in comparison to a receiver that is offset from a transmitter.

36 Claims, 5 Drawing Sheets

(56) References Cited

U.S. PATENT DOCUMENTS

| | | | |
|---|---|---|---|
| 9,496,081 B2* | 11/2016 | Norconk | H02J 5/005 |
| 9,548,621 B2* | 1/2017 | Asanuma | H01F 38/14 |
| 2005/0073466 A1 | 4/2005 | Karlsen | |
| 2006/0061324 A1 | 3/2006 | Oglesbee | |
| 2009/0096413 A1 | 4/2009 | Partovi et al. | |
| 2010/0181841 A1 | 7/2010 | Azancot et al. | |
| 2010/0259217 A1 | 10/2010 | Baarman et al. | |
| 2011/0115429 A1 | 5/2011 | Toivola et al. | |
| 2011/0217927 A1 | 9/2011 | Ben-Shalom et al. | |
| 2011/0304216 A1 | 12/2011 | Baarman | |
| 2012/0154086 A1 | 6/2012 | Willemsen et al. | |
| 2013/0043734 A1 | 2/2013 | Stone et al. | |
| 2013/0093252 A1 | 4/2013 | Norconk et al. | |
| 2013/0175877 A1 | 7/2013 | Abe et al. | |
| 2013/0214591 A1 | 8/2013 | Miller et al. | |
| 2013/0249479 A1 | 9/2013 | Partovi | |
| 2013/0307468 A1 | 11/2013 | Lee et al. | |
| 2014/0070622 A1 | 3/2014 | Keeling et al. | |
| 2014/0167688 A1 | 6/2014 | Doyle et al. | |
| 2014/0232330 A1 | 8/2014 | Robertson et al. | |
| 2014/0266031 A1 | 9/2014 | Sasaki | |
| 2015/0091388 A1 | 4/2015 | Golko et al. | |
| 2015/0295416 A1 | 10/2015 | Li | |
| 2015/0372493 A1 | 12/2015 | Sankar | |
| 2016/0111887 A1 | 4/2016 | Jeong | |

OTHER PUBLICATIONS

Wireless Power Consortium, "Qi System Description Wireless Power Transfer," vol. I: Low Power, Part 1: Interface Definition, Version 1.1.2, Jun. 2013.

Maniktala, S., "Fixing EMI across the Board," EE Times, Nov. 5, 2003, http://www.eetimes.com/document.asp?doc_id=1230444.

Maniktala, S., "More on Designing Reliable Electronic Ballasts," EE Times, Apr. 20, 2005, http://www.eetimes.com/document.asp?doc_id=1272231.

Maniktala, S. "The Confluence of Resonant Switching Topologies and Wireless Charging," presented at ISSCC 2015, San Francisco, CA, Feb. 26, 2015.

Maniktala, S., "WPT Breaks All Connections, Part 1," EDN Network, Mar. 9, 2015, http://www.edn.com/design/power-management/4438850/WPT-breaks-all-connections-Part-1.

Maniktala, S., "WPT Breaks All Connections, Part 2," EDN Network, Mar. 14, 2015, http://www.edn.com/design/power-management/4438924/WPT-breaks-all-connections--Part-2.

Maniktala, S., "WPT Breaks All Connections, Part 3," EDN Network, Apr. 6, 2015, http://www.edn.com/design/power-management/4439125/WPT-breaks-all-connections-Part-3.

Power Matters Alliance, "PMA Inductive Wireless Power and Charging Transmitter Specification—System Release 1," PMA-TS-0003-0 v2.00, Apr. 24, 2014.

Power Matters Alliance, "PMA Inductive Wireless Power and Charging Receiver Specification—System Release 1," PMA-TS-0001-0 v1.00, Nov. 16, 2013.

"Notification of Transmittal of the International Search Report and the Written Opinion of the International Searching Authority," Int'l Appl. No. PCT/US2017/020465, dated May 11, 2017.

"Notification of Transmittal of the International Search Report and the Written Opinion of the International Searching Authority," Int'l Appl. No. PCT/US2016/66105, dated Feb. 17, 2017.

"Notification of Transmittal of the International Search Report and the Written Opinion of the International Searching Authority," Int'l Appl. No. PCT/US2017/049756, dated Nov. 9, 2017.

* cited by examiner

WIRELESS POWER ALIGNMENT GUIDE

CROSS-REFERENCE TO RELATED APPLICATION

This application claims the benefit of U.S. Provisional Patent Application No. 62/142,465, entitled "Wireless Power Alignment Guide, and" filed on Apr. 2, 2015 and U.S. Provisional Patent Application No. 62/139,785, entitled "Wireless Power Transfer Method Using Multiple Coil Arrays," filed on Mar. 29, 2015. The subject matter of the related applications is hereby incorporated by reference in its entirety.

FIELD OF THE INVENTION

This invention relates generally to wireless power transfer and more specifically to an alignment guide for wireless power transfer.

BACKGROUND

Electronic devices typically require a connected (wired) power source to operate, for example, battery power or a wired connection to a direct current ("DC") or alternating current ("AC") power source. Similarly, rechargeable battery-powered electronic devices are charged using a wired power-supply that connects the electronic device to a DC or AC power source. The limitation of these devices is the need to directly connect the device to a power source using wires.

Wireless power transfer (WPT) involves the use of time-varying magnetic fields to wirelessly transfer power from a source to a device. Faraday's law of magnetic induction provides that if a time-varying current is applied to one coil (e.g., a transmitter coil) a voltage will be induced in a nearby second coil (e.g., a receiver coil). The voltage induced in the receiver coil can then be rectified and filtered to generate a stable DC voltage for powering an electronic device or charging a battery. The receiver coil and associated circuitry for generating a DC voltage can be connected to or included within the electronic device itself such as a smartphone.

The Wireless Power Consortium (WPC) was established in 2008 to develop the Qi inductive power standard for charging and powering electronic devices. Powermat is another well-known standard for WPT developed by the Power Matters Alliance (PMA). The Qi and Powermat near-field standards operate in the frequency band of 100-400 kHz. The problem with near-field WPT technology is that typically only 5 Watts of power can be transferred over the short distance of 2 to 5 millimeters between a power source and an electronic device, though there are ongoing efforts to increase the power. For example, some concurrently developing standards achieve this by operating at much higher frequencies, such as 6.78 MHz or 13.56 MHz. Though they are called magnetic resonance methods instead of magnetic induction, they are based on the same underlying physics of magnetic induction. There also have been some market consolidation efforts to unite into larger organizations, such as the AirFuel Alliance consisting of PMA and the Rezence standard from the Alliance For Wireless Power (A4WP), but the technical aspects have remained largely unchanged.

Some techniques for WPT use two or more transmitter coils in an attempt to overcome the issue of low power transfer over short distances. Typically, two identical transmitter coils (e.g., both wound in the clockwise direction or both wound in the counter-clockwise direction and having substantially the same shape, equal number of turns and substantially the same area) are coupled in series or parallel on a single magnetic layer to transfer power to a receiver coil. Alternatively, the coils can be placed in close proximity to one another without the use of a magnetic layer. This configuration results in the applied time-varying current flowing through both coils in the same direction at any point in time, generating an almost perpendicular combined magnetic field with flux lines that flow from both coils in the same direction (i.e., the magnetic field generated by either coil has the same polarity as the other coil). Magnetic flux lines tend to repel if they are in the same direction, which causes the flux lines to radiate through the air for great distances, increasing the likelihood of failing Electromagnetic Interference (EMI) requirements. EMI requirements, including, for example, spurious emissions requirements, are set forth by the Federal Communications Commission (FCC) and the European Telecommunications Standard Institute (ETSI). When magnetic flux lines radiate away from a transmitter coil into the environment, there is a higher likelihood that energy will be emitted in neighboring frequency bands that will exceed spurious emission requirements.

When magnetic flux lines repel, the magnetic reluctance is high, resulting in a weak magnetic field that reduces the amount of magnetic coupling between the transmitter coils and a receiver coil placed in close proximity (i.e., 2-5 millimeters) to the transmitter coils. So although the coil area is larger than in a single-coil transmitter, the resulting magnetic flux available to transfer power is reduced. If the transmitter coils are placed on separate magnetic layers, an air gap exists between the magnetic layers resulting in an even weaker generated magnetic field as the air gap further increases the reluctance between the transmitter coils.

Transmitters that comply with existing WPT standards also achieve substantially lower power transfer to an electronic device if the receiver coil in the electronic device is not properly centered over the transmitter coil. One technique used to address this issue is increasing the frequency of the time-varying current applied to the transmitter coil (e.g., frequencies above 400 kHz). Although higher frequencies of operation may increase the amount of power transferred over the distance between a transmitter coil and a receiver coil, higher frequencies of operation may interfere with the operation of other devices and may also fail EMI requirements, including, for example, spurious emissions by radiating energy into neighboring frequencies.

Due to the short range of existing WPT technology, for effective power transfer the receiver coil connected to a device must be centered with the transmitter coil connected to a device and the coils cannot be more than 2-5 millimeters apart. One technique for centering a receiver coil in an electronic device with a transmitter coil in a wireless power transmitter is via magnets. However, this technique is not capable of ensuring perfect alignment between the coils as the magnets could be offset from one another and the user would not otherwise be aware of the offset. Further, the use of magnets is practical only for devices that are perfectly flat and devices that are large enough to accommodate large magnets that maintain a strong connection between the transmitter and receiver devices. Even where the use of magnets is possible, magnets are known to cause eddy current losses when used in conjunction with coils, which degrade overall system efficiency. For this reason, the Qi standard has started phasing out previously approved coils with built-in magnets.

Another technique for aligning a receiver coil with a transmitter coil involves the addition of low-power detection coils for each axis of the electronic device. For example, one detection coil can be used for measuring x-axis offset and a second detection coil can be used for measuring y-axis offset. When a single coil is used to measure offset for each axis of an electronic device, each coil is aligned such that the axis being measured passes through the center of the coil, resulting in the coil being positioned perpendicular to the axis. That means both the x-axis and y-axis coils are positioned parallel to the magnetic field generated by the transmitter coil, resulting in a very small surface area for coupling of the magnetic field. Accordingly, each coil receives only a small percentage of the magnetic field generated by the transmitter coil, which results in a proportionately small induced voltage in each detector coil on the order of micro-volts. Each low-power detection coil is connected to a high impedance voltage detector, which typically includes an amplifier stage. Due to the small induced voltage, the voltage must be amplified to calculate an offset associated with any misalignment of a given receiver coil with the transmitter coil. The receiver device will then emit a sound when the calculation based on the detected induced voltage suggests that that the receiver and transmitter coils are centered. One problem with this technique is that the induced voltage, which is on the order of micro-volts, is susceptible to noise interference resulting in substantial error in the offset calculation. Although the receiver device may emit a sound indicating to the user that the transmitter and receiver coils are aligned, the coils may actually be offset due to error in the offset calculation caused by noise. The offset error is further magnified by the need to amplify the induced voltage. Another problem with this technique is that it is not possible to determine the direction of offset when using one detection coil per axis. The offset calculation simply provides a magnitude (e.g., ½ inch) and is not capable of specifying whether the offset is ½ inch to the right or ½ inch to the left, requiring significant trial and error for the user to manually find the calculated alignment between the transmitter and receiver coils. Because a misalignment between a receiver coil and a transmitter coil can result in significant reduction in the amount of power transferred, the current state of WPT technology is not suitable for many consumer devices.

SUMMARY OF THE INVENTION

In one embodiment, a wireless power alignment guide uses multiple coils and a detector circuit to calculate an offset between a wireless power receiver and a wireless power transmitter. The detector circuit identifies the calculated offset so that a user can properly align the transmitter and receiver coils to enable greater amounts of power to be transferred in comparison to a receiver coil that is offset from a transmitter coil. Further, aligning the transmitter and receiver results in less of the magnetic field generated by the transmitter radiating into the atmosphere, increasing the likelihood of meeting EMI compliance requirements.

In one embodiment of a wireless power alignment guide, two coils are configured in series to detect an offset in a direction (e.g., ½ inch to the left). A wireless power transmitter emits a magnetic field that will generate a time-varying voltage across each coil having a different polarity. As a result of the magnetic field a first time-varying current will flow in the first coil and a second time-varying current will flow in the second coil. The first time-varying current will flow from the first coil to the second coil and the second time-varying current will flow from the second coil to the first coil. The difference between the first time-varying current and the second time-varying current results in a net time-varying current. The sum of the time-varying voltage across each coil results in a net time-varying voltage. A detector circuit detects a voltage resulting from the first time-varying current and the second time-varying current, which is the same as the net time-varying voltage. The detector circuit uses the detected voltage to calculate an offset in a direction. The wireless power alignment guide can be implemented in a receiver device that includes a receiver coil. The offset is identified to a user so the user can center the receiver with the transmitter. The offset can be identified to the user visually, audibly and/or by tactile feedback. The magnetic field generated by the transmitter magnetically couples to the receiver coil and causes a time-varying current to flow through the receiver coil. The receiver can further include a receiver circuit that can generate a DC voltage, filter noise, and regulate the generated DC voltage under load.

In another embodiment, two coils are configured in series to detect an offset in a first direction (e.g., ½ inch to the right in the positive x-direction) and two additional coils are configured in series to detect an offset in a second direction perpendicular to the first direction (e.g., one inch in the positive y-direction). A transmitter emits a magnetic field that generates a time-varying voltage across each coil having a different polarity. As a result of the magnetic field, a first time-varying current will flow in the first coil and a second time-varying current will flow in the second coil. The magnetic field also causes a third time-varying current to flow in the third coil and a fourth time-varying current to flow in the fourth coil. The first time-varying current will flow from the first coil to the second coil and the second time-varying current will flow from the second coil to the first coil. Similarly, the third time-varying current will flow from the third coil to the fourth coil and the fourth time-varying current will flow from the fourth coil to the third coil. The difference between the first time-varying current and the second time-varying current results in a first net-time varying current. The difference between the third time-varying current and the fourth time-varying current results in a second net-time varying current. The sum of the time-varying voltage across the first coil and the second coil results in a first net time-varying voltage. The sum of the time-varying voltage across the third coil and the fourth coil results in a second net time-varying voltage. The first coil and the second coil can be configured to detect horizontal offset (e.g., to the left or to the right in the x-direction) and the third coil and the fourth coil can be configured to detect offset in a second direction (e.g., in the positive or negative y-direction). A detector circuit detects a first voltage resulting from the first net time-varying current, which is the same as the first net time-varying voltage. A detector circuit detects a second voltage resulting from the second net time-varying current, which is the same as the second net time-varying voltage. The detector circuit uses the first voltage to calculate a first offset in a first direction and uses the second voltage to calculate a second offset in a second direction. The wireless power alignment guide can be implemented in a receiver device that includes a receiver coil. The first offset and the second offset are identified to the user so the user can center the receiver with the transmitter. The offset can be identified to the user visually, audibly and/or by tactile feedback. The magnetic field generated by the transmitter magnetically couples to the receiver coil and causes a time-varying current to flow through the receiver coil. The receiver can further include a receiver circuit that can generate a DC voltage, filter noise, and regulate the generated DC voltage under load.

In another embodiment, the coils of the wireless power alignment guide are oriented on a single plane. The wireless power alignment guide can be implemented in a device that can be wirelessly charged. The wireless power alignment guide performs best when oriented by the user to be perpendicular to a magnetic field generated by a wireless power transmitter coil. This configuration maximizes the coil surface area for coupling of the magnetic field to the coils of the wireless power alignment guide, resulting in an induced voltage that is on the order of several volts.

In another embodiment, coils for the wireless power alignment guide can be located in such a way that the coils partially overlap.

DETAILED DESCRIPTION

Figure 1:
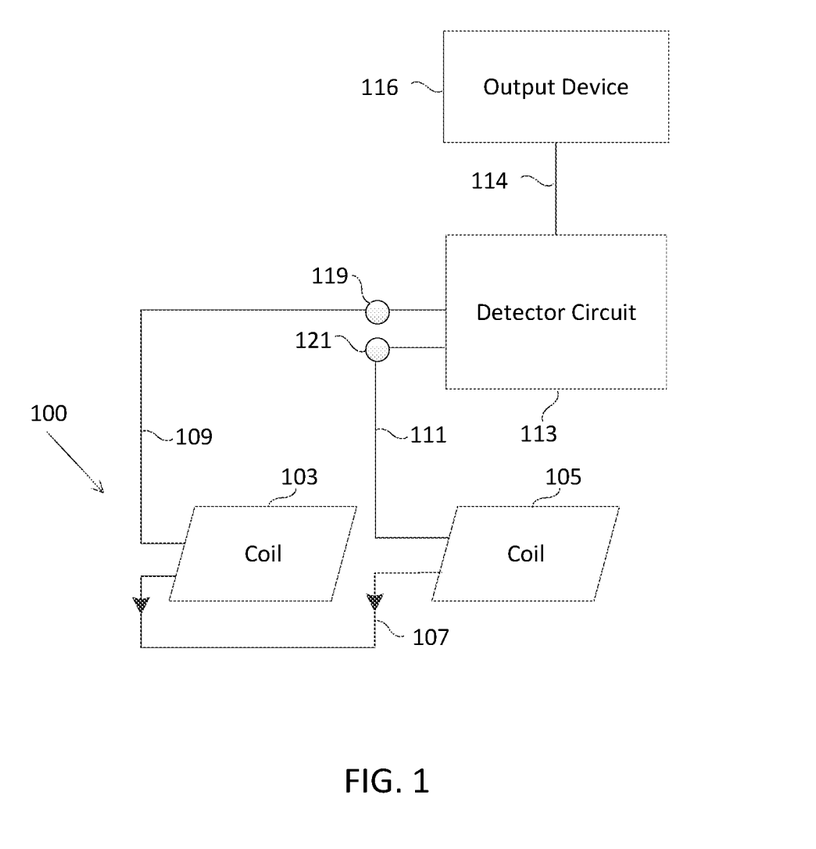
FIG. 1 is a block diagram illustrating one embodiment of a wireless power alignment guide using two coils.

FIG. 1 is a block diagram of one embodiment of a wireless power alignment guide 100 using two coils. A coil 103 and a coil 105 are preferably identical coils with substantially the same shape, equal number of turns and substantially the same area. Coil 103 and coil 105 can be any shape, including, for example, circular, square or triangular. Coil 103 and coil 105 are configured in series and are oriented in a single plane. For example, coil 103 and coil 105 of wireless power alignment guide 100 can be incorporated within a smartphone device that can be charged wirelessly, and oriented on a plane that is geometrically parallel with the surface of the smartphone device that is intended to receive power wirelessly. If a user places the smartphone device over a wireless power transmitter that generates a magnetic field (not shown), coil 103 and coil 105 would be oriented perpendicular to the magnetic field generated by the wireless power transmitter. This configuration maximizes the coil surface area for coupling of the magnetic field to coils 103 and 105, which induces a time-varying voltage in each coil, typically on the order of several volts. The wireless power transmitter can have a single coil or multiple coils, including, for example, the multiple coil transmitters described in concurrently filed U.S. patent application Ser. No. 15/082,533 entitled "Wireless Power Transfer Using Multiple Coils Arrays," the subject matter of which is hereby incorporated by reference in its entirety.

The voltage induced in coil 103 will have a first polarity and will produce a time-varying current in coil 103 that flows to coil 105 through a connection 107. Similarly, the voltage induced in coil 105 will have a second polarity that is opposite from the first polarity and produces a time-varying current in coil 105 that flows through connection 107 to coil 103. A detector circuit 113 includes two terminals, a terminal 119 and a terminal 121. Terminals 119 and 121 of detector circuit 113 present a high impedance. Due to the high impedance, the current induced in coil 103 and the current induced in coil 105 will be small (e.g., on the order of micro-amperes). Either terminal 119 or terminal 121 can represent a path to ground for detector circuit 113. Detector circuit 113 is capable of detecting an AC signal of a defined voltage magnitude received by coil 103 and coil 105 by monitoring terminals 119 and 121. The detected AC signal can be, but is not limited to, a square wave, a sinusoidal wave, a triangular wave, or a sawtooth wave. If coil 103 and coil 105 are spaced an equal distance from the center of the magnetic field generated by the transmitter, the induced voltage in coils 103 and 105 will be equal in magnitude but will have opposite polarity, resulting in the detected AC signal having zero volts. If coil 103 is closer to the center of the magnetic field than coil 105, the induced voltage in coil 103 will be larger in magnitude than the induced voltage in coil 105, resulting in the detected AC signal having a non-zero voltage. Accordingly, the detected AC signal is equal to the sum of the induced voltage in coil 103 and the induced voltage in coil 105.

Detector circuit 113 uses the detected AC signal to determine whether wireless power alignment guide 100 is aligned with the transmitter. Detector circuit 113 emits a signal indicating the detected alignment to an output device 116 through a connection 114. Output device 116 uses the signal from detector circuit 113 to provide an output to the user. Output device 116 can be implemented as any device suitable for providing a visible (e.g., display or LEDs), audible (e.g., speaker) or tactile output (e.g., vibrator) to a user. For example, a first LED may light up or pulse on and off if wireless power alignment guide 100 is offset to the left. A second LED may light up or pulse on and off if wireless power alignment guide 100 is offset to the right. As the user moves wireless power alignment guide 100 towards alignment, the corresponding LED may pulse on and off at a progressively faster rate. The first and the second LEDs may light up simultaneously when wireless power alignment guide 100 is aligned with the transmitter. Coils 103 and 105 and connections 107, 109, 111 and 114 can be formed of wire or traces on a printed circuit board using conductive material such as copper, gold, or any other conductive material known in the art.

Figure 2:
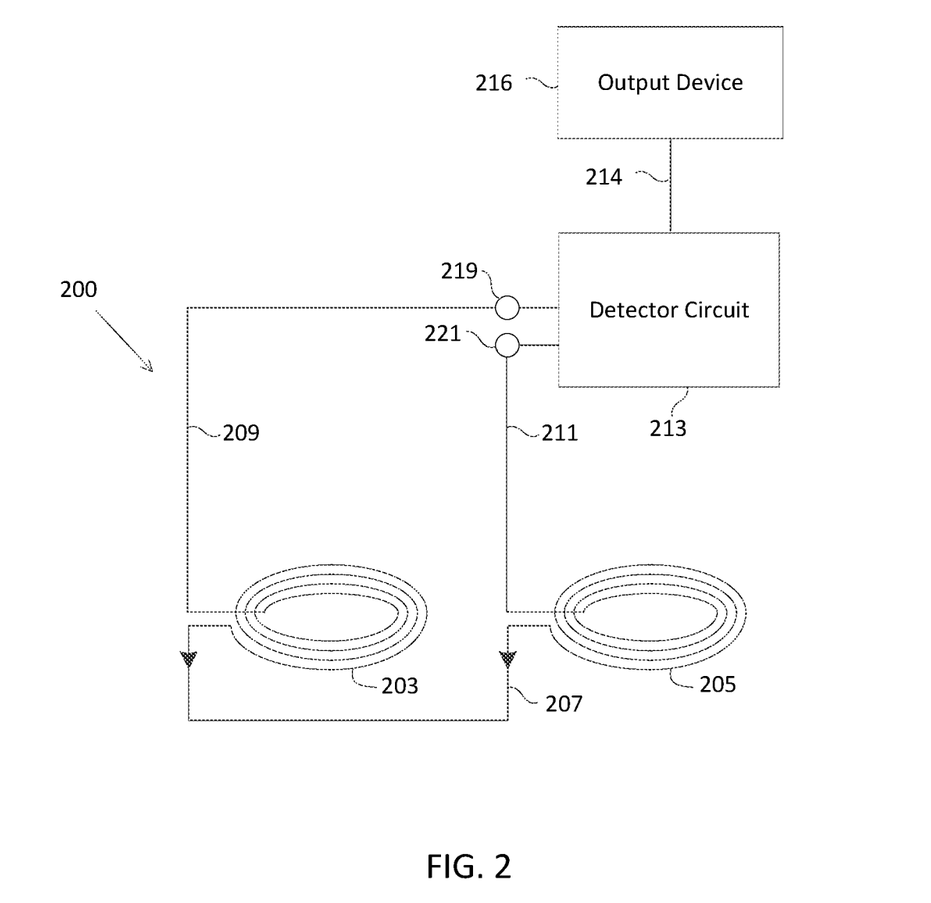
FIG. 2 is a schematic diagram illustrating one embodiment of a wireless power alignment guide using two coils wound in the same direction.

FIG. 2 is a schematic diagram illustrating one embodiment of a wireless power alignment guide 200 using two coils wound in the same direction. A coil 203 and a coil 205 are preferably identical coils with the same shape, the same number of turns, the same area, and wound in the same direction. Coil 203 and coil 205 are both wound in the clockwise direction, but both coils could alternatively be wound in the counter-clockwise direction. Coil 203 and coil 205 can be any shape, including, for example, circular, square or triangular. Coil 203 and coil 205 are configured in series and are oriented in a single plane. For example, coil 203 and coil 205 of wireless power alignment guide 200 can be incorporated within a smartphone device that can be charged wirelessly, and oriented on a plane that is geometrically parallel with the surface of the smartphone device that is intended to receive power wirelessly. If a user places the smartphone device over a wireless power transmitter that generates a magnetic field (not shown), coil 203 and coil 205 would be oriented perpendicular to the magnetic field generated by the wireless power transmitter. This configuration maximizes the coil surface area for coupling of the magnetic field to coils 203 and 205, which induces a time-varying voltage in each coil, typically on the order of several volts. The voltage induced in coil 203 will have a first polarity and will produce a time-varying current in coil 203 that flows to coil 205 through a connection 207. The voltage induced in coil 205 will have a second polarity that is opposite from the first polarity and will produce a time-varying current in coil 205 that flows through connection 207 to coil 203. A detector circuit 213 includes two terminals, a terminal 219 and a terminal 221. Terminals 219 and 221 of detector circuit 213 present a high impedance. Due to the high impedance, the current induced in coil 203 and the current induced in coil 205 will be small (e.g., on the order of micro-amperes). Either terminal 219 or terminal 221 can represent a path to ground for detector circuit 213. Detector circuit 213 is capable of detecting an AC signal of a defined voltage magnitude received by coil 203 and coil 205 by monitoring terminals 219 and 221. The detected AC signal can be, but is not limited to, a square wave, a sinusoidal wave, a triangular wave, or a sawtooth wave.

If coil 203 and coil 205 are spaced an equal distance from the center of the magnetic field generated by the transmitter, the induced voltage in coils 203 and 205 will be equal in magnitude but will have opposite polarity, resulting in the detected AC signal having zero volts. If coil 203 is closer to the center of the magnetic field than coil 205, the induced voltage in coil 203 will be larger in magnitude than the induced voltage in coil 205, resulting in the detected AC signal having a non-zero voltage. Accordingly, the detected AC signal is equal to the sum of the induced voltage in coil 203 and the induced voltage in coil 205.

Detector circuit 213 uses the detected AC signal to determine whether wireless power alignment guide 200 is aligned with the transmitter. Detector circuit 213 emits a signal indicating the detected alignment to an output device 216 through a connection 214. Output device 216 uses the signal from detector circuit 213 to provide an output to the user. Output device 216 can be implemented as any device suitable for providing a visible (e.g., display or LEDs), audible (e.g., speaker) or tactile output (e.g., vibrator) to a user. For example, a first LED may light up or pulse on and off if the wireless power alignment guide 200 is offset to the left. A second LED may light up or pulse on and off if the wireless power alignment guide 200 is offset to the right. As the user moves the wireless power alignment guide 200 towards alignment, the corresponding LED may pulse on and off at a progressively faster rate. The first and the second LEDs may light up simultaneously when the wireless power alignment guide 200 is aligned with the transmitter. Coils 203 and 205 and connections 207, 209. 211 and 214 can be formed of wire or traces on a printed circuit board using conductive material such as copper, gold, or any other conductive material known in the art.

The configuration of coil 203 and coil 205 in wireless power alignment guide 200 is similar to the two-coil wireless power transmitter disclosed in FIG. 2 of U.S. patent application Ser. No. 15/082,533. The use of a similar coil configuration for wireless power alignment guide 200 demonstrates the duality that good transmitters make good receivers.

Figure 3:
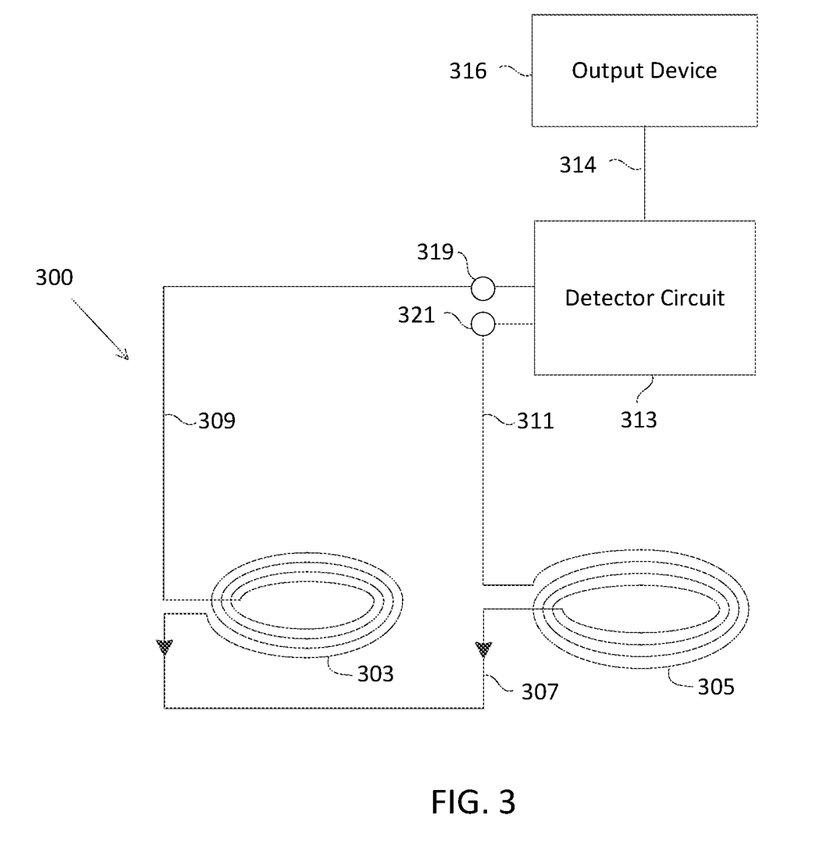
FIG. 3 is a schematic diagram illustrating one embodiment of a wireless power alignment guide using two coils wound in opposite directions.

FIG. 3 is a schematic diagram illustrating one embodiment of a wireless power alignment guide 300 using two coils wound in opposite directions. A coil 303 and a coil 305 are preferably identical coils with substantially the same shape, equal number of turns and substantially the same area. Coil 303 is wound in the clockwise direction and coil 305 is wound in the counter-clockwise direction, but coil 303 could alternatively be wound in the counter-clockwise direction and coil 305 could be wound in the clockwise direction. Coil 303 and coil 305 can be any shape, including, for example, circular, square or triangular. Coil 303 and coil 305 are configured in series and are oriented in a single plane. For example, coil 303 and coil 305 of wireless power alignment guide 300 can be incorporated within a smartphone device that can be charged wirelessly, and oriented on a plane that is geometrically parallel with the surface of the smartphone device that is intended to receive power wirelessly. If a user places the smartphone device over a wireless power transmitter that generates a magnetic field (not shown), coil 303 and coil 305 would be oriented perpendicular to the magnetic field generated by the wireless power transmitter. This configuration maximizes the coil surface area for coupling of the magnetic field to coils 303 and 305, which induces a time-varying voltage in each coil, typically on the order of several volts.

The voltage induced in coil 303 will have a first polarity and will produce a time-varying current in coil 303 that flows to coil 305 through a connection 307. The voltage induced in coil 305 will have a second polarity that is opposite from the first polarity and will produce a time-varying current in coil 305 that flows through connection 307 to coil 303. A detector circuit 313 includes two terminals, a terminal 319 and a terminal 321. Terminals 319 and 321 of detector circuit 313 present a high impedance. Due to the high impedance, the current induced in coil 303 and the current induced in coil 305 will be small (e.g., on the order of micro-amperes). Either terminal 319 or terminal 321 can represent the path to ground for detector circuit 313. Detector circuit 313 is capable of detecting an AC signal of a defined voltage magnitude received by coil 303 and coil 305 by monitoring terminals 319 and 321. The detected AC signal can be, but is not limited to, a square wave, a sinusoidal wave, a triangular wave, or a sawtooth wave.

If coil 303 and coil 305 are spaced an equal distance from the center of the magnetic field generated by the transmitter, the induced voltage in coils 303 and 305 will be equal in magnitude but will have opposite polarity, resulting in the detected AC signal having zero volts. If coil 303 is closer to the center of the magnetic field than coil 305, the induced voltage in coil 303 will be larger in magnitude than the induced voltage in coil 305, resulting in the detected AC signal having a non-zero voltage. Accordingly, the detected AC signal is equal to the sum of the induced voltage in coil 303 and the induced voltage in coil 305.

Detector circuit 313 uses the detected AC signal to determine whether the wireless power alignment guide 300 is aligned with the transmitter. Detector circuit 313 emits a signal indicating the detected alignment to an output device 316 through a connection 314. The output device 316 uses the signal from detector circuit 313 to provide an output to the user. Output device 316 can be implemented as any device suitable for providing a visible (e.g., display or LEDs), audible (e.g., speaker) or tactile output (e.g., vibrator) to a user. For example, a first LED may light up or pulse on and off if the wireless power alignment guide 300 is offset to the left. A second LED may light up or pulse on and off if the wireless power alignment guide 300 is offset to the right. As the user moves wireless power alignment guide 300 towards alignment, the corresponding LED may pulse on and off at a progressively faster rate. The first and the second LEDs may light up simultaneously when the wireless power alignment guide 300 is aligned with the transmitter. Coils 303 and 305 and connections 307, 309, 311 and 314 can be formed of wire or traces on a printed circuit board using conductive material such as copper, gold, or any other conductive material known in the art.

The configuration of coil 303 and coil 305 in wireless power alignment guide 300 is similar to the two-coil wireless power transmitter disclosed in FIG. 3 of U.S. patent application Ser. No. 15/082,533. The use of a similar coil configuration for wireless power alignment guide 300 demonstrates the duality that good transmitters make good receivers.

Figure 4:
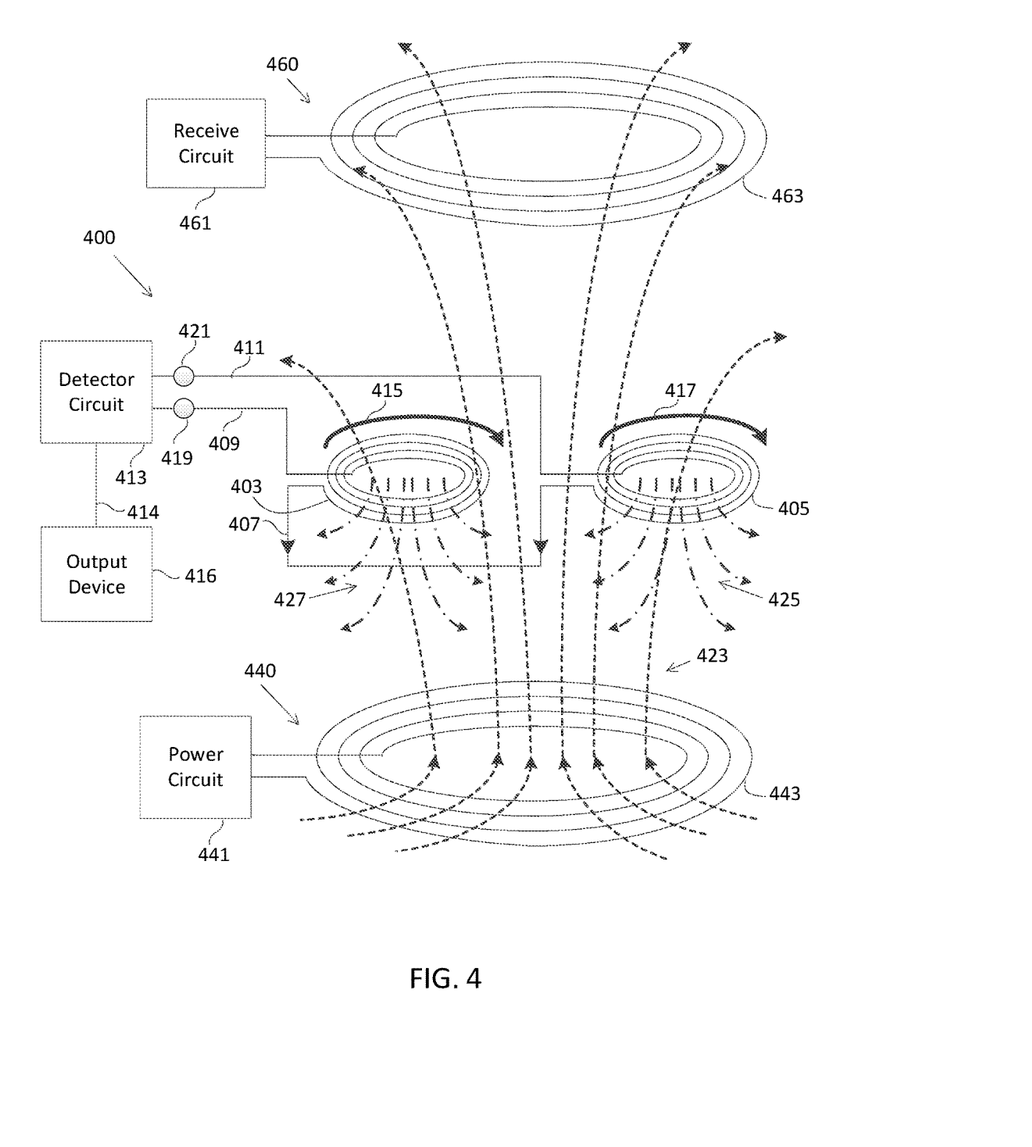
FIG. 4 is a schematic diagram illustrating one embodiment of a wireless power alignment guide using two coils for detecting alignment of a receiver coil with a transmitter coil.

FIG. 4 is a schematic diagram illustrating one embodiment of a wireless power alignment guide 400 using two coils for detecting alignment of a wireless power receiver 460 with a wireless power transmitter 440. A coil 403 and a coil 405 are preferably identical coils with substantially the same shape, the same number of turns, substantially the same area, and wound in the same direction. Similar to the embodiment of FIG. 2, coil 403 and coil 405 are both wound in the clockwise direction, but both coils could alternatively be wound in the counter-clockwise direction. Coil 403 and coil 405 can be any shape, including, for example, circular, square or triangular. Coil 403 and coil 405 are configured in series and are oriented in a single plane. For example, coil 403 and coil 405 of wireless power alignment guide 400 can be incorporated within a smartphone device that can be charged wirelessly, and oriented on a plane that is geometrically parallel with the surface of the smartphone device that is intended to receive power wirelessly. If a user places the smartphone device over wireless power transmitter 440 that generates a magnetic field represented by flux lines 423, coil 403 and coil 405 would be oriented perpendicular to the magnetic field generated by the wireless power transmitter. This configuration maximizes the coil surface area for coupling of the magnetic field to coils 403 and 405, which induces a time-varying voltage in each coil, typically on the order of several volts.

A detector circuit 413 includes two terminals, a terminal 419 and a terminal 421. Either terminal 419 or terminal 421 can represent the path to ground for detector circuit 413. Detector circuit 413 is capable of detecting an AC signal of a defined voltage magnitude received by coil 403 and coil 405 by monitoring terminals 419 and 421. The detected AC signal can be, but is not limited to, a square wave, a sinusoidal wave, a triangular wave, or a sawtooth wave.

A wireless power transmitter 440 contains a coil 443 that is connected to a power circuit 441. Power circuit 441 generates an AC signal that causes a time-varying current to flow through coil 443, which generates a magnetic field represented by flux lines 423. The embodiment of FIG. 4 uses a single coil transmitter for simplicity, however, any single coil or multi-coil transmitter can be used, including for example, the wireless power transmitters disclosed in U.S. patent application Ser. No. 15/082,533.

Flux lines 423 magnetically couple to coil 403 and coil 405, inducing a time-varying voltage in each coil. If coil 403 and coil 405 are both spaced an equal distance from the center of the magnetic field generated by coil 443 (i.e., coil 403 and coil 405 are in alignment with coil 443), both coil 403 and coil 405 will receive the same proportion of flux lines 423 and the induced voltage in each coil will have the same magnitude but opposite polarity, resulting in the detected AC signal having zero volts. If coil 403 and coil 405 are not spaced an equal distance from the center of magnetic field generated by coil 443, the coil that receives a larger proportion of flux lines 423 will have an induced-time varying voltage that is larger in magnitude than the other coil, resulting in the detected AC signal having a non-zero voltage. Accordingly, the detected AC signal is equal to the sum of the induced voltage in coil 403 and the induced voltage in coil 405.

According to Faraday's Law, flux lines 423 from coil 443 will cause coil 403 to generate an opposing magnetic field represented by flux lines 427 that flow in the downward direction. According to the right hand rule, the downward flow of flux lines 427 will cause a current 415 to flow in the clockwise direction through coil 403. Similarly, flux lines 423 from coil 443 will cause coil 405 to generate an opposing magnetic field represented by flux lines 425 that flow in the downward direction. The downward flow of flux lines 425 causes a current 417 to flow in coil 405 in the clockwise direction.

Current 415 flows from coil 403 to coil 405 through a connection 407. Similarly, current 417 flows from coil 405 through connection 407 to coil 403. If coil 403 and coil 405 are in alignment with coil 443, current 415 will have the same magnitude as current 417. Current 415 and current 417 will cancel one another out because current 415 and current 417 have the same magnitude but flow in different directions. If current 415 and current 417 cancel out, the sum of the induced voltage in coils 403 and 405 will be zero volts. If coil 403 is horizontally spaced farther from the center of coil 443 than coil 405 (i.e., offset to the left), current 415 will have a smaller magnitude than current 417. A net current (i.e., current 415 subtracted from current 417) will flow through both coils 403 and 405. If a net current flows through coils 403 and 405, the sum of the induced voltage in coils 403 and 405 will be a non-zero voltage.

Terminals 419 and 421 of detector circuit 413 present a high impedance. As a result of the high impedance presented by detector circuit 413 current 415 and current 417 will be on the order of micro-amperes. However, a lower impedance detector circuit 413 can also be used.

The detected AC signal is used by detector circuit 413 to determine the direction of the offset. If coil 403 is closer to the center of coil 443 than coil 405, the detected AC signal applied to terminals 419 and 421 of detector circuit 413 may have a positive voltage (e.g., 200 mV), which indicates that the direction of the offset is to the right. If coil 405 is closer to the center of coil 443 than coil 403, the detected AC signal applied to terminals 419 and 421 of detector circuit 413 may have a negative voltage (e.g., −200 mV), which indicates that the direction of the offset is to the left. Detector circuit 413 may include an amplifier or other circuitry to amplify the detected AC signal applied to terminals 419 and 421. The detected AC signal progressively declines to 0V as the user moves the wireless alignment guide 400 towards alignment. The detected AC signal can further be used by the detector circuit 413 to determine the distance of the offset (e.g., ½ inch) based upon prior testing correlating measurements of induced voltage in each coil to a corresponding offset from a given transmitter coil. Such testing can be used to develop a statistical model and associated algorithm that estimates the offset distance.

The high impedance presented by detector circuit 413 also limits the magnitude of magnetic flux lines 427 and 425. Accordingly, magnetic flux lines 425 and 427 do not interfere with magnetic flux lines 423 generated by coil 443. Magnetic flux lines 423 flow through coils 403 and 405 and magnetically couple to coil 463 of the wireless power receiver 460. The magnetic coupling of magnetic flux lines 423 to coil 463 generates a time-varying current that flows through coil 463 to a receive circuit 461. The receive circuit 461 can include, but is not limited to, a rectifier to generate a DC voltage, a filter to reduce noise, and a voltage regulator to define a voltage magnitude and maintain the voltage under load. The voltage generated as a result of the coupling of flux lines 423 to coil 463 can be used to charge a battery or power a device (e.g., a smart phone, laptop or any other electronic device).

Wireless power receiver 460 and wireless power alignment guide 400 can be implemented using a single printed circuit board having multiple layers. Coil 403 and coil 405 can be implemented in a first layer of the printed circuit board, whereas coil 463 can be implemented in a second layer of the printed circuit board. Coil 463 is preferably in alignment with coil 403 and coil 405. However, if coil 403 and coil 405 are offset from coil 463, the offset calculation performed by detector circuit 413 must compensate for any preexisting offset of coil 463 from coil 403 and coil 405.

Wireless power alignment guide 400 and wireless power receiver 460 are preferably implemented in a receiver device so that the device can identify the detected offset and direction to a user of the device. Detector circuit 413 emits a signal indicating the detected alignment to an output device 416 through a connection 414. Output device 416 uses the signal from detector circuit 413 to provide an output to the user identifying the detected offset. Output device 416 can be implemented as any device suitable for communicating the detected offset. For example, the detected offset can be communicated to the user visually (e.g., displaying on a display of the receiver device the offset and the direction the receiver device must be moved to center the device with coil 443 of transmitter 440) and/or audibly (e.g., by emitting a sound when the receiver device is centered with coil 443 of transmitter 440). Alignment can also be indicated to the user by tactile feedback (e.g., the receiver device emits pulses of vibrations at a progressively faster rate as the user moves the receiver device closer to the center of coil 443 of transmitter 440). Another possible implementation includes the use of LEDs. For example, a first LED may light up or pulse on and off if the wireless power alignment guide 400 is offset to the left. A second LED may light up or pulse on and off if the wireless power alignment guide 400 is offset to the right. As the user moves the wireless power alignment guide 400 towards alignment, the corresponding LED may pulse on and off at a progressively faster rate. The first and the second LEDs may light up simultaneously when the wireless power alignment guide 400 is aligned with the transmitter.

Wireless power alignment guide 400 allows a user to easily and precisely correct the offset between a wireless power transmitter and a wireless power receiver, significantly increasing the amount of power that can be wirelessly transferred. Coils 403, 405, 443 and 463 and connections 407, 409, 411 and 414 can be formed of wire or traces on a printed circuit board using conductive material such as copper, gold, or any other conductive material known in the art.

The embodiment of FIG. 4 has been described using two coils that are wound in the same direction, similar to the embodiment of FIG. 2. The coils could alternatively be wound in opposite directions, similar to the embodiment of FIG. 3.

The embodiment of FIG. 4 uses a single coil receiver for simplicity, however, any single coil or multi-coil receiver can be used, including for example, the wireless power receivers disclosed in U.S. patent application Ser. No. 15/082,533.

Figure 5:
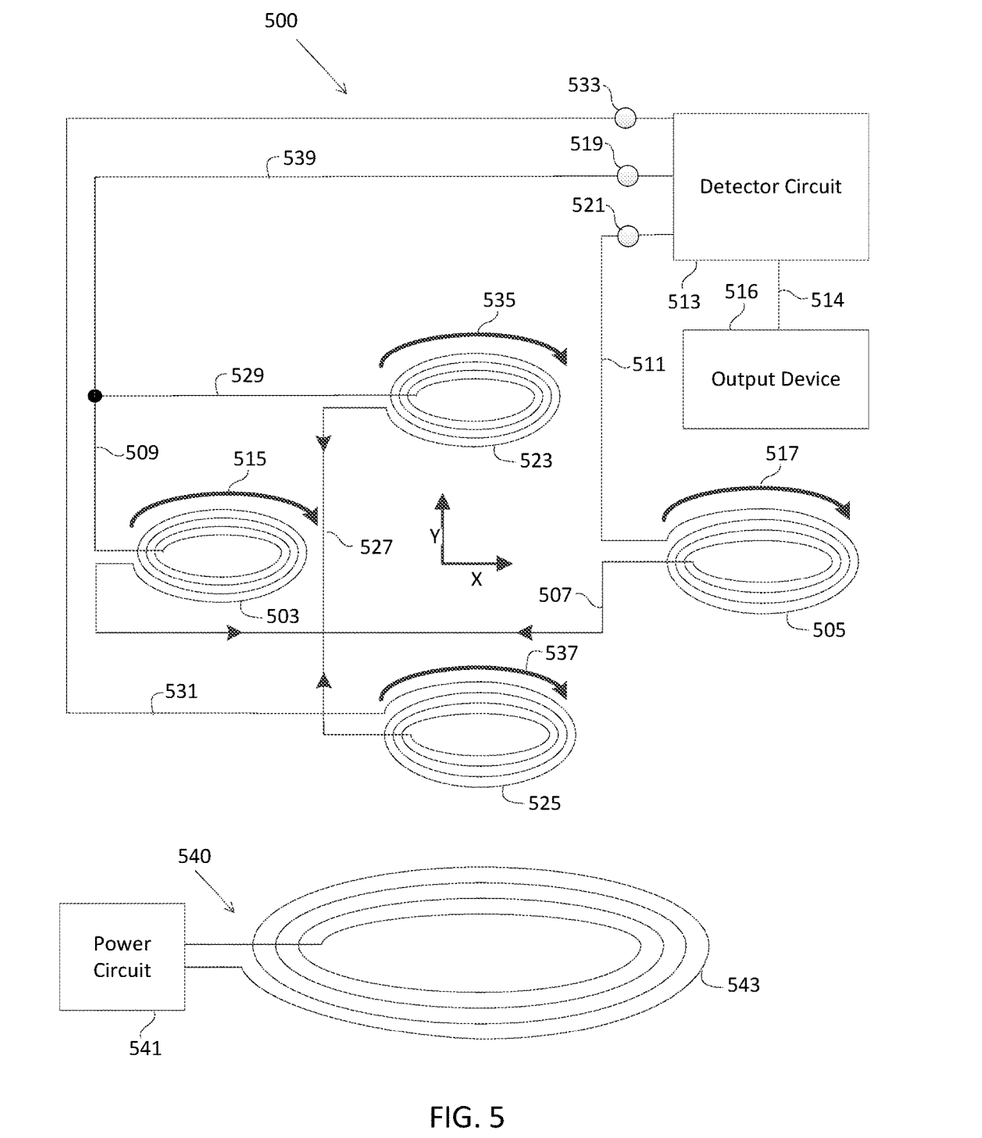
FIG. 5 is a schematic diagram illustrating one embodiment of a wireless power alignment guide using four coils for detecting alignment with a transmitter coil.

FIG. 5 is a schematic diagram illustrating one embodiment of a wireless power alignment guide 500 using four coils for detecting alignment with a wireless power transmitter 540. Coils 503, 505, 523 and 525 are preferably identical coils with substantially the same shape, equal number of turns and substantially the same area. Similar to the embodiment of FIG. 3, coil 503 and coil 505 are wound in opposite directions and coil 523 and coil 525 are wound in opposite directions. Coil 503 and coil 523 are wound in the clockwise direction, whereas coil 505 and coil 525 are wound in the counter-clockwise direction. Coils 503, 505, 523 and 525 can be any shape, including, for example, circular, square or triangular. Coils 503 and 505 can be arranged to detect a misalignment to the left or to the right (the x-axis) and coils 523 and 525 can be arranged to detect a misalignment in a perpendicular direction (the y-axis). Coil 503 and coil 505 are configured in series and are oriented in a single plane. Similarly, coil 523 and coil 525 are configured in series and are oriented in the same plane as coil 503 and coil 505. For example, coils 503, 505, 523 and 525 of wireless power alignment guide 500 can be incorporated within a smartphone device that can be charged wirelessly, and oriented on a plane that is geometrically parallel with the surface of the smartphone device that is intended to receive power wirelessly. If a user places the smartphone device over a wireless power transmitter that generates a magnetic field (not shown), coils 503, 505, 523 and 525 would be oriented perpendicular to the magnetic field generated by the wireless power transmitter. This configuration maximizes the coil surface area for coupling of the magnetic field to coils 503, 505, 523 and 525, which induces a time-varying voltage in each coil, typically on the order of several volts.

A detector circuit 513 includes three terminals, a terminal 533, a terminal 519 and a terminal 521. Terminal 519 can represent the path to ground for detector circuit 513. Detector circuit 513 is capable of detecting an AC signal of a defined voltage magnitude received by coil 503 and coil 505 by monitoring terminals 519 and 521. Detector circuit 513 is also capable of detecting an AC signal of a defined voltage magnitude received by coil 523 and coil 525 by monitoring terminals 519 and 533. The detected AC signals can be, but are not limited to, a square wave, a sinusoidal wave, a triangular wave, or a sawtooth wave.

A wireless power transmitter 540 contains a coil 543 that is connected to a power circuit 541. Power circuit 541 generates an AC signal that causes a time-varying current to flow through coil 543, which generates a magnetic field that causes magnetic flux lines (not shown) to flow in the upward direction. The embodiment of FIG. 5 uses a single coil transmitter for simplicity, however, any single coil or multi-coil transmitter can be used, including, for example, the wireless power transmitters disclosed in U.S. patent application Ser. No. 15/082,533.

Flux lines from coil 543 magnetically couple to coils 503, 505, 523 and 525, inducing a time-varying voltage in each coil. If coil 503 and coil 505 are both spaced an equal distance from the center of the magnetic field generated by coil 543 (i.e., coil 503 and coil 505 are in alignment with coil 523), both coil 503 and coil 505 will receive the same proportion of flux lines from coil 543 and the induced voltage in each coil will have the same magnitude but opposite polarity, resulting in the detected AC signal having zero volts. If coil 503 and coil 505 are not spaced an equal distance from the center of the magnetic field generated by coil 543, the coil that receives a larger proportion of the magnetic flux lines will have an induced-time varying voltage that is larger in magnitude than the other coil, resulting in the detected AC signal having a non-zero voltage. Accordingly, the detected AC signal is equal to the sum of the induced voltage in coil 503 and the induced voltage in coil 505. The same is true for coils 523 and 525.

According to Faraday's Law, the magnetic flux lines from coil 543 will cause coils 503, 505, 523 and 525 to generate an opposing magnetic field that causes flux lines (not shown) to flow in the downward direction. The downward flow of flux lines from coils 503, 505, 523 and 525 will cause currents 515, 517, 535 and 537 to flow in the clockwise direction. Current 515 flows from coil 503 to coil 505 through a connection 507 and current 517 flows from coil 505 through connection 507 to coil 503. Similarly, current 535 flows from coil 523 to coil 525 through a connection 527 and current 537 flows from coil 525 through connection 527 to coil 523.

If coil 503 and coil 505 are in alignment with coil 543, current 515 will have the same magnitude as current 517. Current 515 and current 517 will cancel one another out because current 515 and current 517 have the same magnitude but flow in different directions. If current 515 and current 517 cancel out, the sum of the induced voltage in coils 503 and 505 will be zero volts. If coil 503 is spaced farther from the center of coil 543 than coil 505 (i.e., offset to the left in the negative x-direction), current 515 will have a smaller magnitude than current 517 and a net current (i.e., current 515 subtracted from current 517) will flow through both coils 503 and 505. If a net current flows through coils 503 and 505, the sum of the induced voltage in coils 503 and 505 will be a non-zero voltage.

If coil 523 and coil 525 are in alignment with coil 543, current 535 will have the same magnitude as current 537. Current 535 and current 537 will cancel one another out because current 535 and current 537 have the same magnitude but flow in different directions. If current 535 and current 537 cancel out, the sum of the induced voltage in coils 523 and 525 will be zero volts. If coil 523 is spaced farther from the center of coil 543 than coil 525 (i.e., offset in the positive y-direction), current 535 will have a smaller magnitude than current 537 and a net current (i.e., current 535 subtracted from current 537) will flow through both coils 523 and 525. If a net current flows through coils 523 and 525, the sum of the induced voltage in coils 523 and 525 will be a non-zero voltage.

Terminals 519, 521 and 533 of detector circuit 513 present a high impedance. As a result of the high impedance presented by detector circuit 513 currents 515, 517, 535 and 537 will be on the order of micro-amperes. However, a lower impedance detector circuit 513 can also be used.

Detector circuit 513 may include amplifiers or other circuitry to amplify the detect AC signal applied to terminals 519 and 521 and/or the detected AC signal applied to terminals 519 and 533. The detected AC signal(s) are used by detector circuit 513 to calculate the direction associated with the offset. If coil 503 is closer to coil 543 than coil 505, the detected AC signal applied to terminals 519 and 521 may have a positive voltage (e.g., 200 mV), which indicates that the direction of the offset is to the right. If coil 505 is closer to coil 543 than coil 503, the detected AC signal applied to terminals 519 and 521 may have a negative voltage (e.g., −200 mV), which indicates that the direction of the offset is to the left. If coil 525 is closer to coil 543 than coil 523, the detected AC signal applied to terminals 519 and 533 may have a positive voltage (e.g., 200 mV), which indicates that the direction of the offset is in the positive y-direction. If coil 523 is closer to coil 543 than coil 525, the detected AC signal applied to terminals 519 and 533 may have a negative voltage (e.g., −200 mV), which indicates that the direction of the offset is in the negative y-direction. The detected AC signal progressively declines to 0V as the user moves the wireless alignment guide 500 towards alignment. The detected AC signal can further be used by the detector circuit 513 to determine the distance of the offset (e.g., ½ inch) based upon prior testing correlating measurements of the induced voltage in each coil to a corresponding offset from a given transmitter coil. Such testing can be used to develop a statistical model and associated algorithm that estimates the offset distance.

The high impedance presented by detector circuit 513 also limits the magnitude of the magnetic flux lines generated by coils 503, 505, 523 and 525. Accordingly, the magnetic fields generated by coils 503, 505, 523 and 525 do not interfere with the magnetic field generated by coil 543, which can flow through coils 503, 505, 523 and 525 to a wireless power receiver (not shown). The magnetic flux lines generated by coil 543 will magnetically couple to the receive coil of a wireless power receiver, generating a time-varying current that flows to a receive circuit (not shown). The receive circuit can include, but is not limited to, a rectifier to generate a DC voltage, a filter to reduce noise, and a voltage regulator to define a voltage magnitude and maintain the voltage under load. The voltage generated as a result of the coupling of magnetic flux lines generated by coil 543 to a wireless power receiver can be used to charge a battery or power a device (e.g., a smart phone, laptop or any other electronic device).

Wireless power alignment guide 500 can be implemented using a single printed circuit board having multiple layers. Coil 503, coil 505, coil 523 and coil 525 can be implemented in a first layer of the printed circuit board, whereas the receive coil can be implemented in a second layer of the printed circuit board. Alternatively, coil 503 and coil 505 can be implemented in a first layer of the printed circuit board, coil 523 and coil 525 can be implemented in a second layer of the printed circuit board, and the receive coil can be implemented in a third layer of the printed circuit board. If coils 503 and 505 or coils 523 and 525 are offset from the receive coil, the offset calculation performed by detector circuit 513 must compensate for any preexisting offset.

If wireless power alignment guide 500 and a wireless power receiver are implemented in a receiver device, the device can identify the detected offset and direction to a user of the device. Detector circuit 513 emits a signal indicating the detected alignment to an output device 516 through a connection 514. The output device 516 uses the signal from detector circuit 513 to provide an output to the user identifying the detected offset. Output device 516 can be implemented as any device suitable for communicating the detected offset. For example, the detected offset can be communicated to the user visually (e.g., displaying on a display of the receiver device the offset and the direction the receiver device must be moved to center the device with coil 543 of transmitter 540) and/or audibly (e.g., by emitting a sound when the receiver device is centered with coil 543 of transmitter 540). Alignment can also be indicated to the user by tactile feedback (e.g., the receiver device emits pulses of vibrations at a progressively faster rate as the user moves the receiver device closer to the center of coil 543 of transmitter 540). Another possible implementation includes the use of LEDs. For example, a first LED may light up or pulse on and off if the wireless power alignment guide 500 is offset to the left. A second LED may light up or pulse on and off if the wireless power alignment guide 500 is offset to the right. As the user moves the wireless power alignment guide 500 towards alignment, the corresponding LED may pulse on and off at a progressively faster rate. The first and the second LEDs may light up simultaneously when the wireless power alignment guide 500 is aligned with the transmitter.

Wireless power alignment guide 500 allows a user to easily and precisely correct the offset between a wireless power transmitter and a wireless power receiver, significantly increasing the amount of power that can be wirelessly transferred. Coils 503, 505, 523, 525 and 543 and connections 507, 509, 511, 514, 527, 531 and 539 can be formed of wire or traces on a printed circuit board using conductive material such as copper, gold, or any other conductive material known in the art.

The embodiment of FIG. 5 has been described using two coils that are wound in opposite directions, similar to the embodiment of FIG. 3. The coils could alternatively be wound in the same direction, similar to the embodiment of FIG. 2.

In all embodiments, coils for the wireless power alignment guide can be placed close enough to one another such that the coils partially overlap. For example, in the context of two coils, the outer edge of one coil can pass through the geometric center of the other coil, and vice versa. Similarly, the first coil and the second coil can be separated by a distance that is approximately equal to five times the diameter of the coils. These dimensions are not intended to be limiting as the use of different types of coils (i.e., coils having different number of turns, shapes, etc.), among other factors, may allow for more overlap or larger separation between the coils.

The wireless power alignment guides disclosed in the embodiments of FIGS. 1-5 are not limited to the context of increasing the amount of wireless power transfer between a transmitter and receiver. The embodiments of FIGS. 1-5 can be used in any context, including, for example, components of machinery that must be brought into precise alignment. Such machinery may include a transmitter coil in one component of a machine and one of the wireless power alignment guides of FIGS. 1-5 in a second component of the machine. The transmitter coil could be used to generate a magnetic field. If the wireless power alignment guide is offset from the transmitter (i.e., the first component is offset from the second component), the coils of the wireless power alignment guide would produce a net induced voltage. The net-induced voltage could be used to drive an amplifier, which in turn drives a motor that moves the second component towards alignment. Such an implementation would be self-aligning as the net-induced voltage would decline to 0 volts as the motor drives the second component towards alignment. Once the two components are in alignment, the coils of the wireless power alignment guide would have an induced voltage equal to 0V, causing the motor to stop driving the second component once precise alignment is achieved between the first component and the second component.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:
1. A wireless power alignment device comprising:
an alignment coil structure comprising
a first coil having a first axis, the first coil configured to produce a first time-varying voltage having a first polarity in response to a magnetic field, and;
a second coil having a second axis, the second axis being different than the first axis of the first coil, the second coil configured to produce a second time-varying voltage having a second polarity in response to the magnetic field, the second polarity being different than the first polarity
wherein the second coil is coupled to the first coil in such a way that a first time-varying current caused by the first time-varying voltage flows from the first coil to the second coil and a second time-varying current caused by the second time-varying voltage flows from the second coil to the first coil; and
a voltage detector having a first terminal and a second terminal, the first terminal being coupled to the first coil and the second terminal being coupled to the second coil, the voltage detector configured to detect a net voltage across the alignment coil structure and to generate an alignment signal based on the net voltage.

2. The wireless power alignment device of claim 1, further comprising:
an output device coupled to the voltage detector, the output device configured to produce a user-detectable output in response to the alignment signal, the user-detectable output indicating alignment or misalignment of the alignment coil structure relative to a transmitter emitting the magnetic field.

3. The wireless power alignment device of claim 1, wherein the first coil is wound in a clockwise direction.

4. The wireless power alignment device of claim 3, wherein the second coil is wound in the clockwise direction.

5. The wireless power alignment device of claim 3, wherein the second coil is wound in a counter-clockwise direction.

6. The wireless power alignment device of claim 1, wherein the first coil and the second coil have an equal number of turns, substantially the same shape, and substantially the same area.

7. The wireless power alignment device of claim 1, wherein the voltage detector is further configured to calculate an offset direction using the net voltage.

8. The wireless power alignment device of claim 1, wherein the voltage detector is further configured to calculate an offset amount using the net voltage.

9. The wireless power alignment device of claim 1, further comprising:
a wireless power receiver coil configured to produce a third time-varying voltage in response to the magnetic field; and
a wireless power receiver circuit coupled to the wireless power receiver coil, wherein the wireless power receiver circuit comprises a rectifier configured to generate a DC voltage from the third time-varying voltage.

10. The wireless power alignment device of claim 9, further comprising a printed circuit board, wherein the alignment coil structure is located on a first layer of the printed circuit board and the wireless power receiver coil is located on a second layer of the printed circuit board.

11. A wireless power alignment device comprising:
an alignment coil structure comprising
a first coil having a first axis, the first coil configured to produce a first time-varying voltage having a first polarity in response to a magnetic field,
a second coil having a second axis, the second axis being different than the first axis of the first coil, the second coil configured to produce a second time-varying voltage having a second polarity in response to the magnetic field, the second polarity being different from the first polarity, wherein the second coil is coupled to the first coil in such a way that a first time-varying current caused by the first time-varying voltage flows from the first coil to the second coil and a second time-varying current caused by the second time-varying voltage flows from the second coil to the first coil, the first coil and the second coil being arranged along a first horizontal axis in a plane, a third coil having a third axis, the third coil configured to produce a third time-varying voltage having a third polarity in response to the magnetic field, and a fourth coil having a fourth axis, the fourth axis being different than the third axis, the fourth coil configured to produce a fourth time-varying voltage having a fourth polarity in response to the magnetic field, the fourth polarity being different than the third polarity, wherein the fourth coil is coupled to the third coil in such a way that a third time-varying current caused by the third time-varying voltage flows from the third coil to the fourth coil and a fourth time-varying current caused by the fourth time-varying voltage flows from the fourth coil to the third coil, the third coil and the fourth coil being arranged along a second horizontal axis in the plane, the second horizontal axis being perpendicular to the first horizontal axis; and a voltage detector having a first terminal, a second terminal, and a third terminal, the first terminal coupled to the first coil and the third coil, the second terminal coupled to the second coil, and the third terminal coupled to the fourth coil, the voltage detector configured to detect a first net voltage across the first terminal and the second terminal and to detect a second net voltage across the first terminal and the third terminal, the voltage detector further configured to generate a first alignment signal based on the first net voltage and to generate a second alignment signal based on the second net voltage.

12. The wireless power alignment device of claim 11, further comprising:
an output device coupled to the voltage detector, the output device configured to produce a user-detectable output in response to the first alignment signal and the second alignment signal, the user-detectable output indicating alignment or misalignment of the alignment coil structure relative to a transmitter emitting the magnetic field.

13. The wireless power alignment device of claim 11, wherein the first coil and the third coil are wound in a clockwise direction.

14. The wireless power alignment device of claim 13, wherein the second coil is wound in the clockwise direction.

15. The wireless power alignment device of claim 13, wherein the second coil is wound in a counter-clockwise direction.

16. The wireless power alignment device of claim 13, wherein the fourth coil is wound in the clockwise direction.

17. The wireless power alignment device of claim 13, wherein the fourth coil is wound in a counter-clockwise direction.

18. The wireless power alignment device of claim 11, wherein the first coil and the second coil have an equal number of turns, substantially the same shape, and substantially the same area.

19. The wireless power alignment device of claim 11, wherein the third coil and the fourth coil have an equal number of turns, substantially the same shape, and substantially the same area.

20. The wireless power alignment device of claim 11, wherein the voltage detector is further configured to calculate a first offset direction along the first horizontal axis using the first net voltage.

21. The wireless power alignment device of claim 11, wherein the voltage detector is further configured to calculate a first offset amount along the first horizontal axis using the first net voltage.

22. The wireless power alignment device of claim 11, wherein the voltage detector is further configured to calculate a second offset direction along the second horizontal axis using the second net voltage.

23. The wireless power alignment device of claim 11, wherein the voltage detector is further configured to calculate a second offset amount along the second horizontal axis using the second net voltage.

24. The wireless power alignment device of claim 11, further comprising:
a wireless power receiver coil configured to produce a fifth time-varying voltage in response to the magnetic field; and
a wireless power receiver circuit coupled to the wireless power receiver coil, wherein the wireless power receiver circuit comprises a rectifier configured to generate a DC voltage from the fifth time-varying voltage.

25. The wireless power alignment device of claim 24, further comprising a printed circuit board, wherein the first coil and the second coil are located on a first layer of the printed circuit board and the wireless power receiver coil is located on a second layer of the printed circuit board.

26. The wireless power alignment device of claim 24, further comprising a printed circuit board, wherein the first coil and the second coil are located on a first layer of the printed circuit board, the third coil and the fourth coil are located on a second layer of the printed circuit board, and the wireless power receiver coil is located on a third layer of the printed circuit board.

27. A wireless power alignment device comprising:
an alignment coil structure comprising
a first coil having a first axis, the first coil configured to generate a first time-varying voltage having a first polarity in response to a magnetic field; and
a second coil having a second axis, the second axis being different from the first axis, the second coil configured to generate a second time-varying voltage having a second polarity in response to the magnetic field, wherein the second coil is coupled to the first coil in such a way that the first polarity is opposite from the second polarity,
the first coil and the second coil being arranged along a horizontal axis in a plane; and
a voltage detector having a first terminal and a second terminal, the first terminal coupled to the first coil and the second terminal coupled to the second coil, the voltage detector configured to detect a net voltage across the alignment coil structure and to generate an alignment signal based on the net voltage.

28. The wireless power alignment device of claim 27, further comprising:
an output device coupled to the voltage detector, the output device configured to produce a user-detectable output in response to the alignment signal, the user-detectable output indicating alignment or misalignment of the alignment coil structure relative to a transmitter emitting the magnetic field.

29. The wireless power alignment device of claim 27, wherein the first coil is wound in a clockwise direction.

30. The wireless power alignment device of claim 29, wherein the second coil is wound in the clockwise direction.

31. The wireless power alignment device of claim 29, wherein the second coil is wound in a counter-clockwise direction.

32. The wireless power alignment device of claim 27, wherein the first coil and the second coil have an equal number of turns, substantially the same shape, and substantially the same area.

33. The wireless power alignment device of claim 27, wherein the voltage detector is further configured to calculate an offset direction along the horizontal axis using the net voltage.

34. The wireless power alignment device of claim 27, wherein the voltage detector is further configured to calculate an offset amount along the horizontal axis using the net voltage.

35. The wireless power alignment device of claim 27, further comprising:
   a wireless power receiver coil configured to generate a third time-varying voltage in response to the magnetic field; and
   a wireless power receiver circuit coupled to the wireless power receiver coil, wherein the wireless power receiver circuit comprises a rectifiers configured to generate a DC voltage from the third time-varying voltage.

36. The wireless power alignment device of claim 35, further comprising a printed circuit board, wherein the alignment coil structure is located on a first layer of the printed circuit board and the wireless power receiver coil is located on a second layer of the printed circuit board.

* * * * *

UNITED STATES PATENT AND TRADEMARK OFFICE
CERTIFICATE OF CORRECTION

PATENT NO. : 10,110,063 B2
APPLICATION NO. : 15/082641
DATED : October 23, 2018
INVENTOR(S) : Sanjaya Maniktala Page 1 of 1

It is certified that error appears in the above-identified patent and that said Letters Patent is hereby corrected as shown below:

In the Claims

Column 20 Line 11, delete "rectifiers" and replace with --rectifier--

Signed and Sealed this
Eleventh Day of December, 2018

Andrei Iancu
*Director of the United States Patent and Trademark Office*